(12) United States Patent
Chen

(10) Patent No.: US 6,347,127 B1
(45) Date of Patent: Feb. 12, 2002

(54) METHOD AND APPARATUS FOR MULTI-SYMBOL MATCHED FILTER ESTIMATION OF AN EVALUATION SYMBOL IN A RECEIVED SIGNAL HAVING A PREDICTABLE INTER-SYMBOL INTERFERENCE

(75) Inventor: Weizhong Chen, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/309,124

(22) Filed: May 10, 1999

(51) Int. Cl.[7] .......................... H03D 1/06; H03D 11/04; H03K 5/01; H03K 6/04; H04B 1/10; H04L 1/00; H04L 25/08

(52) U.S. Cl. ........................ 375/348; 375/343; 375/285

(58) Field of Search ................................. 375/346, 348, 375/349, 350, 316, 325, 340, 342, 130, 140, 142, 143, 144, 148, 150, 152, 254, 285, 343; 708/300, 314

(56) References Cited

U.S. PATENT DOCUMENTS 5,623,511 A * 4/1997 Bar-David et al. .......... 375/143

6,233,290 B1 * 5/2001 Raphaeli ...................... 375/341

FOREIGN PATENT DOCUMENTS

EP 0715421 * 6/1996

* cited by examiner

Primary Examiner—Jean Corrielus
(74) Attorney, Agent, or Firm—R. Louis Breeden; Roland K. Bowler, II

(57) ABSTRACT

A processing system (216) selects (1004) a portion (702–706) of a received signal including an evaluation symbol (702), along with a preceding symbol (704) received immediately before the evaluation symbol, and a following symbol (706) received immediately after the evaluation symbol; and prefixes (1006) to the portion of the received signal a previously estimated symbol (708) received immediately before the portion, thereby producing an evaluation portion (712, 904). The processing system then compares (1008) the evaluation portion with templates equal in length to the evaluation portion and including different combinations of trial symbols and the at least one previously estimated symbol, prefixed to the trial symbols; and estimates (1010) the evaluation symbol to be equal to a trial symbol in one of the templates having a highest correlation with the evaluation portion, the trial symbol having a position matching that of the evaluation symbol in the evaluation portion.

18 Claims, 6 Drawing Sheets

METHOD AND APPARATUS FOR MULTI-SYMBOL MATCHED FILTER ESTIMATION OF AN EVALUATION SYMBOL IN A RECEIVED SIGNAL HAVING A PREDICTABLE INTER-SYMBOL INTERFERENCE

FIELD OF THE INVENTION

This invention relates in general to wireless communication systems, and more specifically to a method and apparatus for a multi-symbol matched filter estimation of a symbol in a received signal having a predictable inter-symbol interference.

BACKGROUND OF THE INVENTION

Modulators often have to utilize premodulation filters to reduce splatter and to meet regulatory guidelines. Such filters, when used with modulators for data symbols can smear the symbol boundaries, causing inter-symbol interference, which can, in turn, reduce receiver sensitivity.

In many applications, receiver sensitivity is of the utmost importance. An example is the inbound (portable-to-base station) channel of a two-way messaging system, where the relatively weak transmitter of the portable unit requires a robust base receiver having great sensitivity in order to achieve a sufficient balance between the inbound and outbound links.

Thus, what is needed is a method and apparatus that can achieve a high receiver sensitivity even in the presence of substantial inter-symbol interference introduced by a relatively severe premodulation filter.

SUMMARY OF THE INVENTION

An aspect of the present invention is a method for a multi-symbol matched filter (MSMF) estimation of an evaluation symbol in a received signal having a predictable inter-symbol interference. The method comprises the steps of selecting a portion of the received signal comprising the evaluation symbol, along with at least one preceding symbol received immediately before the evaluation symbol, and at least one following symbol received immediately after the evaluation symbol; and prefixing to the portion of the received signal at least one previously estimated symbol received immediately before the portion, thereby producing an evaluation portion. The method further comprises the steps of comparing the evaluation portion with a plurality of templates equal in length to the evaluation portion and comprising different combinations of trial symbols and the at least one previously estimated symbol, prefixed to the trial symbols; and estimating the evaluation symbol to be equal to a trial symbol in one of the plurality of templates having a highest correlation with the evaluation portion, the trial symbol having a position matching that of the evaluation symbol in the evaluation portion.

Another aspect of the present invention is a multi-symbol matched filter (MSMF) detector for estimating an evaluation symbol in a received signal having a predictable inter-symbol interference. The detector comprises a processing system for processing the received signal. The processing system includes a processor, and a memory coupled to the processor for storing operating variables and software for programming the processing system. The processing system is programmed to select a portion of the received signal comprising the evaluation symbol, along with at least one preceding symbol received immediately before the evaluation symbol, and at least one following symbol received immediately after the evaluation symbol; and to prefix to the portion of the received signal at least one previously estimated symbol received immediately before the portion, thereby producing an evaluation portion. The processing system is further programmed to compare the evaluation portion with a plurality of templates equal in length to the evaluation portion and comprising different combinations of trial symbols and the at least one previously estimated symbol, prefixed to the trial symbols; and to estimate the evaluation symbol to be equal to a trial symbol in one of the plurality of templates having a highest correlation with the evaluation portion, the trial symbol having a position matching that of the evaluation symbol in the evaluation portion.

Another aspect of the present invention is a receiver for receiving a signal having a predictable inter-symbol interference. The receiver comprises a receiver element for receiving and down-converting the signal, and a multi-symbol matched filter (MSMF) detector coupled to the receiver element for estimating an evaluation symbol in the signal. The detector comprises a processing system for processing the received signal. The processing system includes a processor, and a memory coupled to the processor for storing operating variables and software for programming the processing system. The processing system is programmed to select a portion of the received signal comprising the evaluation symbol, along with at least one preceding symbol received immediately before the evaluation symbol, and at least one following symbol received immediately after the evaluation symbol; and to prefix to the portion of the received signal at least one previously estimated symbol received immediately before the portion, thereby producing an evaluation portion. The processing system is further programmed to compare the evaluation portion with a plurality of templates equal in length to the evaluation portion and comprising different combinations of trial symbols and the at least one previously estimated symbol, prefixed to the trial symbols; and to estimate the evaluation symbol to be equal to a trial symbol in one of the plurality of templates having a highest correlation with the evaluation portion, the trial symbol having a position matching that of the evaluation symbol in the evaluation portion.

DETAILED DESCRIPTION OF THE DRAWINGS

Figure 1:
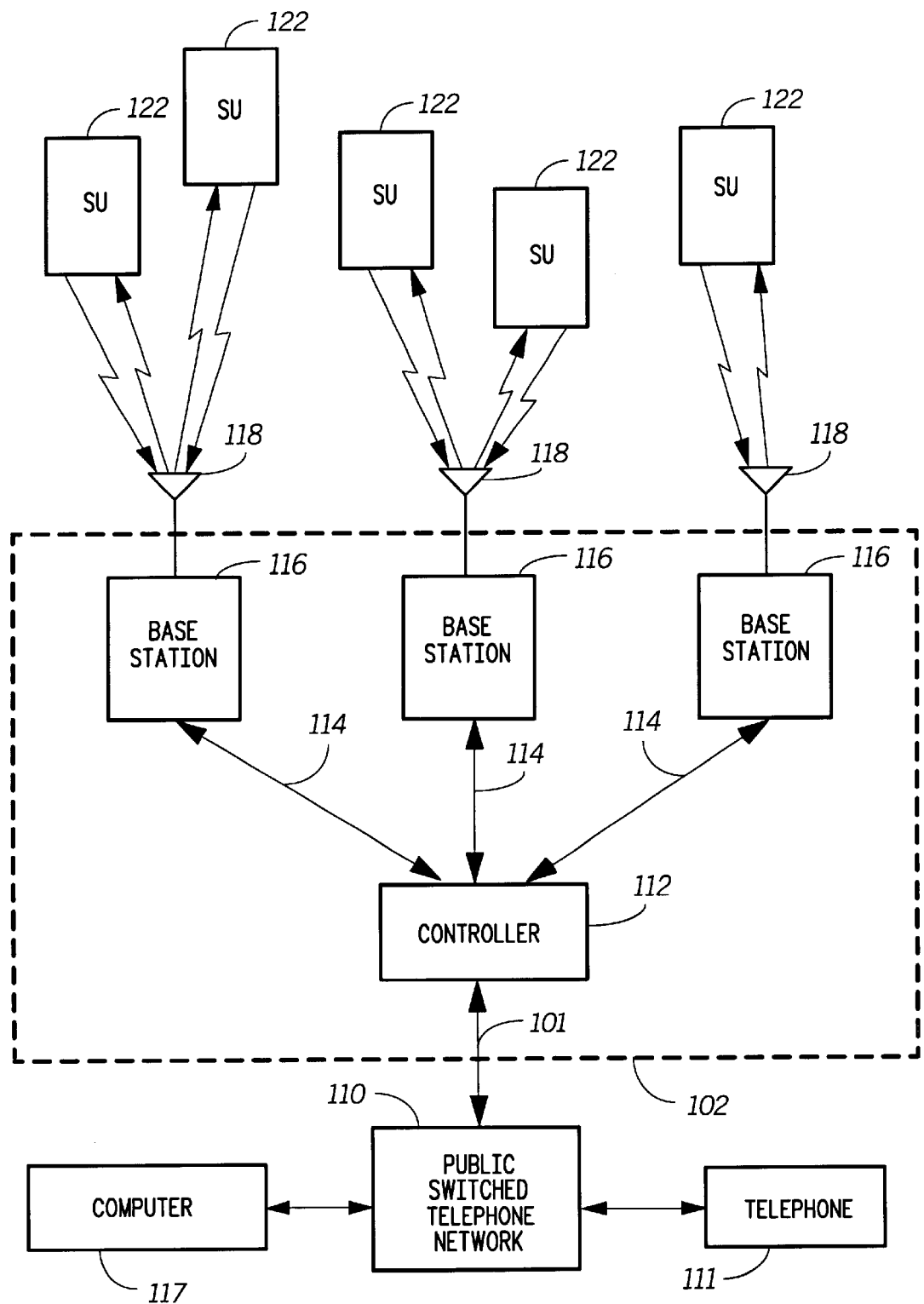
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of base stations 116, the communication system also including a plurality of conventional subscriber units 122. The base stations 116 preferably communicate with the subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc. The hardware of the base stations 116 is preferably a combination of the RF-Orchestra!™ transmitter and the RF-Audience!™ communication receiver manufactured by Motorola, Inc. The software of the communication receiver is preferably modified in accordance with the present invention, as described further below. The subscriber units 122 are preferably similar to PageWriter™ 2000 data subscriber units, also manufactured by Motorola, Inc. It will be appreciated that other similar hardware can be used as well for the controller 112, the base stations 116, and the subscriber units 122.

Each of the base stations 116 transmits RF signals to the subscriber units 122 via an antenna 118. The base stations 116 preferably each receive RF signals from the plurality of subscriber units 122 via the antenna 118. It will be appreciated that separate antennas can be utilized by the base transmitter and base receiver, as well. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be uged for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors arm not too numerous. It will be appreciated that other suitable protocols can be used as well. While the preferred embodiment is a two-way wireless communication system, as depicted in FIG. 1, many aspects of the present invention also are applicable to a one-way wireless communication system, as well. Indeed, the present invention can be applied in the receiver portions of both the base station 116 and the subscriber unit 122, if desired, for better performance in both outbound and inbound directions.

Figure 2:
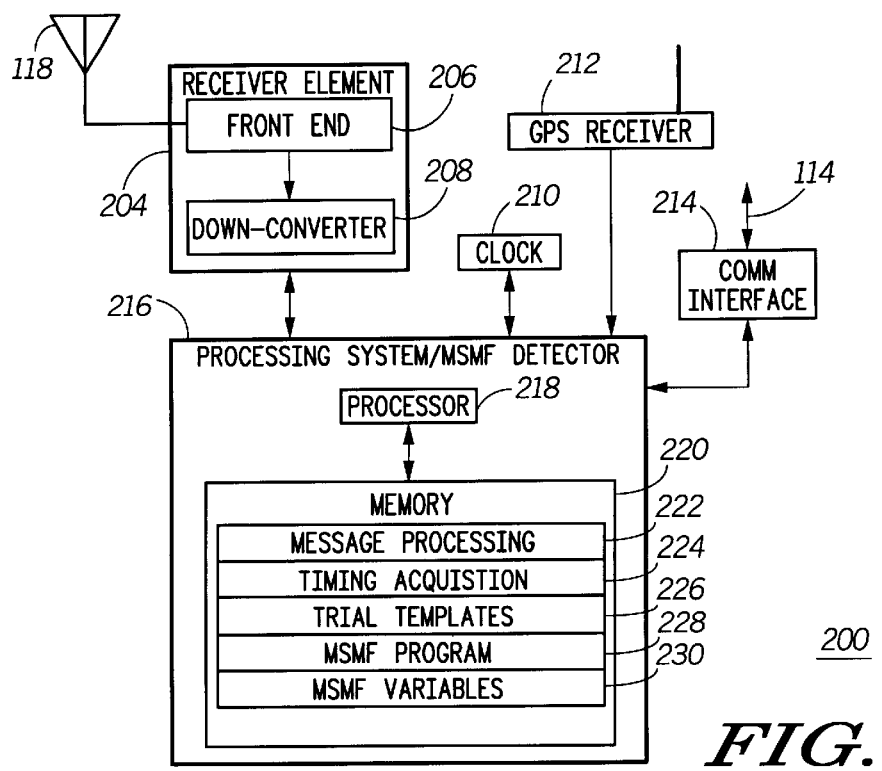
FIG. 2 is an electrical block diagram of an exemplary communication receiver utilized in the base station in accordance with the present invention.

FIG. 2 is an electrical block diagram of an exemplary communication receiver 200 preferably utilized in the base station 116 in accordance with the present invention. The communication receiver 200 comprises the antenna 118 for intercepting an inbound transmission comprising a modulated signal from the portable subscriber unit 122. The modulation type is preferably frequency shift keyed (FSK) modulation. It will be appreciated that, alternatively, other types of modulation, e.g., quadrature amplitude modulation (QAM), can be utilized as well. The antenna 118 is coupled to a conventional front end 206 of a receiver element 204 for receiving the modulated signal. A conventional down-converter 208 is coupled to the front end 206 for down-converting the modulated signal to a baseband signal. The receiver element 204 is coupled to a processing system 216, including a conventional processor 218, preferably a digital signal processor (DSP), for synchronizing the receiver 200 with the symbol timing and for detecting the symbols in the baseband signal. The processor 218 is coupled to a conventional memory 220 comprising storage for variables and software elements for programming the processor 218 to perform a multi-symbol matched filter (MSMF) function in accordance with the present invention.

The memory 220 comprises a message processing element 222 for programming the processing system 216 to process inbound messages received by the communication receiver 200 in accordance with the present invention. The memory 220 further comprises a timing acquisition program 224 for programming the processing system 216 to acquire timing synchronization using well-known techniques. The memory 220 also includes space for storing trial templates 226 representing waveforms corresponding to different combinations of a predetermined number of, e.g., four, nominal symbol values used in the modulated signal. The memory further comprises a MSMF program 228 for programming the processing system 216 to estimate symbols received by the communication receiver 200 in accordance with the present invention. The memory 290 also includes space for storing MSMF variables 230 used in the symbol estimation process.

The communication receiver 200 also preferably includes a conventional clock 210 coupled to the processing system 216 for providing a timing signal thereto. The communication receiver 200 further preferably comprises a conventional Global Positioning Satellite (GPS) receiver 212 coupled to the processing system 216 for sending a periodic timing mark to the processing system 216 in accordance with the present invention. It will be appreciated that, alternatively, some other type of time reference different from GPS can be utilized for generating the periodic timing mark. In addition, the processing system 216 is coupled to a conventional communication interface 214 for communicating with the controller 112 through the communication link 114. Operation of the communication receiver 200 in accordance with the present invention will be described further herein below.

To meet regulatory guidelines for splatter, a Gaussian premodulation filter of BT=0.475 was selected for the transmitter of the subscriber unit 122. It has been verified that a discriminator-based receiver for this modified channel will suffer about 2 dB of sensitivity loss at 9600 bps due to the inter-symbol interference (ISI) caused by the premodulation filter. To recover the lost sensitivity, a novel MSMF detection method and apparatus has been devised. Simulation shows that a one-step MSMF receiver provides 3 dB sensitivity gain over the discriminator-based receiver, and a two-step MSMF receiver provides an additional 0.5 dB sensitivity gain. Advantageously, the additional computation required for the new MSMF detection method is minimal.

Figure 3:
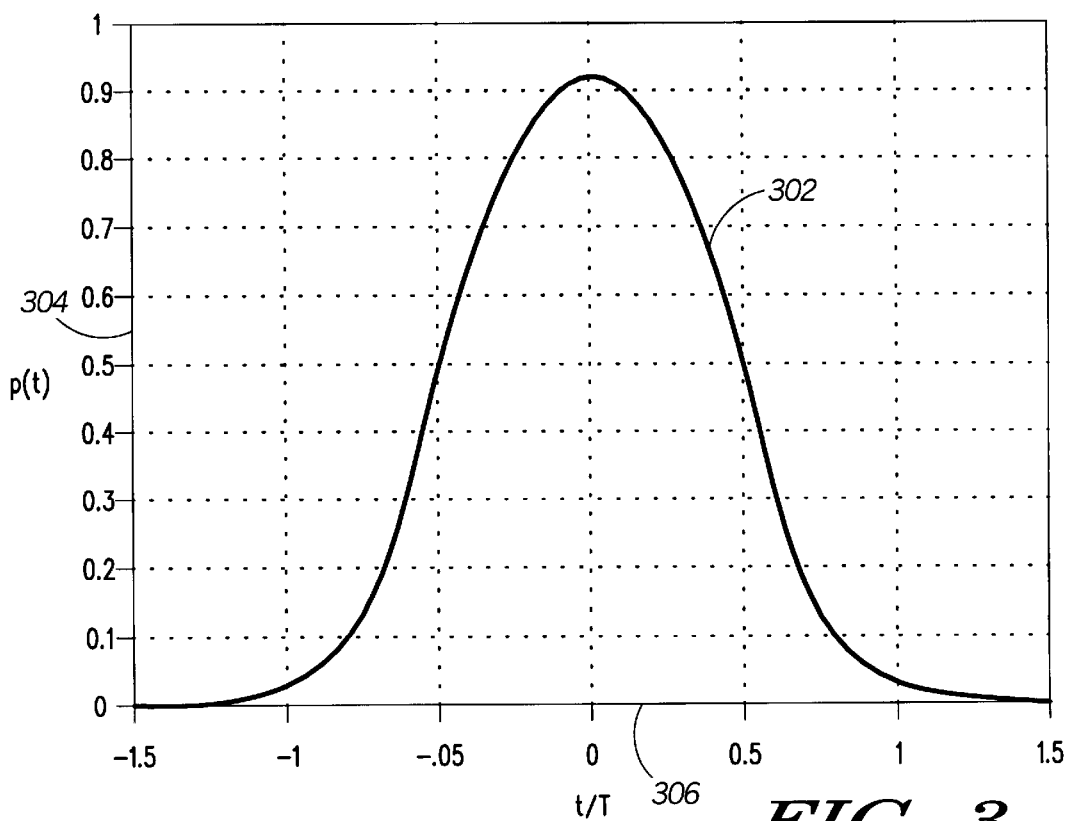
FIG. 3 is a time domain representation of a 1 HZ frequency symbol pulse, which is a rectangular pulse filtered by a Gaussian filter with BT=0.475.

FIG. 3 is a time-domain representation of a 1 HZ frequency symbol pulse 302, which is a rectangular pulse filtered by a Gaussian filter with BT=0.475. Frequency in Hz is plotted on the vertical axis 304, while the ratio of time t to symbol period T is plotted on the horizontal axis 306. With a Gaussian filter as the premodulation filter, a 1 Hz symbol pulse in the frequency domain can be represented by $$p(t) = Q\left[\frac{2\pi B}{\sqrt{\ln 2}}\left(t - \frac{T}{2}\right)\right] - Q\left[\frac{2\pi B}{\sqrt{\ln 2}}\left(t + \frac{T}{2}\right)\right],$$

where t represents time, and $Q(x)$ is the Complementary Error Function. In our example, BT=0.475, $$T = \frac{1}{4800}$$

seconds is the symbol period for 9600 bps, and $p(t) \approx 0$ for $|t| \geq 1.5T$.

The frequency of the FM signal with the symbol sequence $\{s_k\}$ is as follows $$f(t, s_k) = 800 \sum_k s_k p(t - kT)$$

where $s_k = \{-3, -1, 1, 3\}$ corresponding to $\{-2400, -800, +800, +2400\}$ Hz. The phase contribution of each symbol $s_k$ is as follows $$\phi_{s_k}(t) = 2\pi \left\{800 s_k \int_{-\infty}^{t} p(t)dt\right\},$$

where the time t=0 corresponds to the symbol center.

Figure 4:
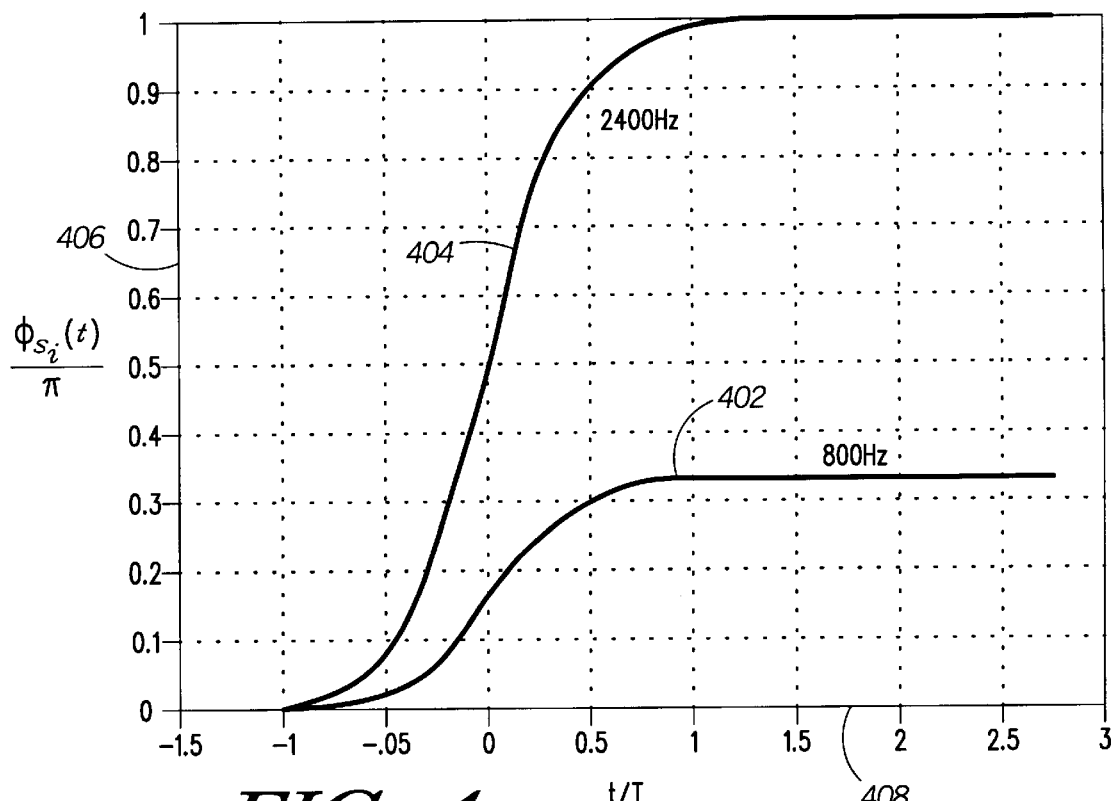
FIG. 4 is a timing diagram depicting phase contributions of 800 Hz and 2400 Hz symbols.

FIG. 4 shows the phase contribution 402 of a symbol of 800 Hz and the phase contribution 404 of a symbol of 2400 Hz. Phase normalized to $\pi$ is plotted on the vertical axis 406, while time normalized to the symbol period is plotted on the horizontal axis 408.

It is known that $$\phi_{s_k}(t) = s_k \frac{\pi}{3}$$

for t>1.5T, and $\phi_{s_k}(t) = 0$ for t<-1.5T. The phase of the FM signal of the symbol sequence $\{s_k\}$ is given by $$\phi(t) = 2\pi \int_{-\infty}^{t} f(t, s)dt = 1600\pi \left\{\sum_k s_k \int_{-\infty}^{t} p(t - kT)dt\right\} = \sum_k \phi_{s_k}(t - kT)$$

Thus, the phase $\phi(t)$ within the kth symbol period can be represented by $$\phi(t) = \left(\sum_{i}^{k-2} s_i\right) \frac{\pi}{3} + \phi_{s_{k-1}}(t - (k-1)T) + \phi_{s_k}(t - kT) + \phi_{s_{k+1}}(t - (k+1)T)$$

Figure 5:
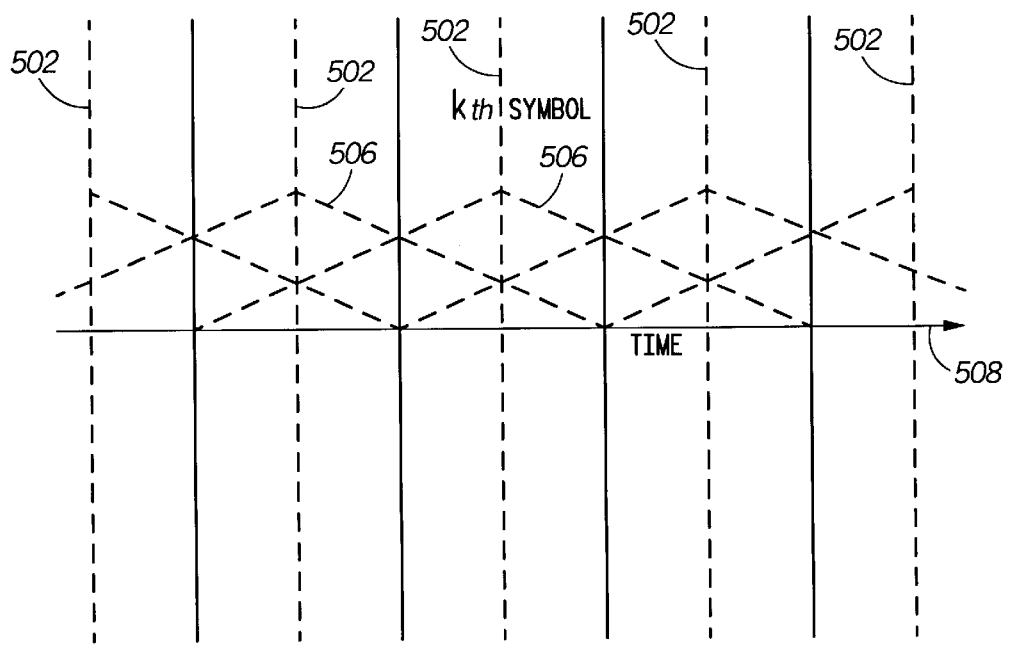
FIG. 5 is a timing diagram depicting symbol overlap produced by a Gaussian filter with BT=0.475, which causes inter-symbol interference (ISI).

FIG. 5 is a timing diagram depicting symbol overlap produced by a Gaussian filter with BT=0.475, which causes inter-symbol interference (ISI). The symbol centers are depicted by vertical dashed lines 502, while the sloping dashed lines 506 depict ISI extending 1.5 symbol periods on either side of the symbol centers. Relative time is plotted on the horizontal axis 508.

The FM signal of the packet is $$s(t) = e^{j\phi(t)}$$

$$s(t) = e^{j\left[\left(\sum_{i}^{k-2} s_i\right)\frac{\pi}{3} + \phi_{s_{k-1}}(t-(k-1)T) + \phi_{s_k}(t-kT) + \phi_{s_{k+1}}(t-(k+1)T)\right]}$$

or $$s(t) = e^{j\left(\sum_{i}^{k-2} s_i\right)\frac{\pi}{3}} \times e^{j\phi_{s_{k-1}}(t-(k-1)T)} \times e^{j\phi_{s_k}(t-kT)} \times e^{j\phi_{s_{k+1}}(t-(k+1)T)}.$$

Let $s_{s_k}(t) = e^{j\Phi_{sk}(t)}$. Then S(t) can also be represented by $$s(t) = \prod_k s_{s_k}(t - kT)$$

Assume the received signal without the additive white Gaussian noise and the multiplicative fading noise is x(t). Then x(t) can be represented by $$x(t) = e^{j\Phi} S(t)$$

where $\Phi$ is an unknown phase offset between the receiver and the transmitter. From the above analysis, it is shown that in any given time period $[T_1, T_2]$, we can remove all the related symbols $\{s_1, s_2, \ldots, s_N\}$ by multiplying x(t) with $(s_{s_k}(t-kT))^* = \exp(-j\phi_{s_k}(t-kT))$, where $(s)^*$ is the conjugate of $(s)$, and where $s_k$ represents those symbols having an influence in the time period $[T_1, T_2]$. The remainder after the removal is simply $e^{j\Phi}$ throughout the period $[T_1, T_2]$, which is a 0 Hz component with phase angle of $\Phi$.

Mathematically, this removal process can be represented by $$y(t | s_1, s_2, \ldots, s_N) = \left\{\prod_{k=1}^{N} (s_{s_k}(t - kT))^* x(t)\right\} = e^{j\Phi}.$$

If the received signal has additive white Gaussian noise n(t), then $x(t) = e^{j\Phi} s(t) + n(t)$, and the matching result y(t) is the superposition of the 0 Hz component $e^{j\Phi}$ with the Gaussian noise n(t) filtered by a filter, which is the matched symbol sequence.

Thus if all combinations of the symbol sequence $\{s_k\}$ are removed from x(t) on a trial basis, for non-coherent detection, the symbol sequence $\{s_1, s_2, \ldots, s_N\}$ can be determined when the metric of $$M(s_1, s_2, \ldots, s_N) = \int_{T_1}^{T_2} |y(t)|^2 \, dt$$

(representing the correlation between the symbol sequence and each combination of trial symbols) is maximized.

Based on the above analysis, we can describe a decision feedback MSMF non-coherent detection approach with reduced ISI effect, in accordance with the present invention. In one embodiment, the 3-symbol MSMF detection uses 64 (for 4-FSK) templates comprising all combinations of three symbols to match the received signal of the three symbols. The middle symbol with the best match is used as the detected symbol value for the middle symbol. Because of the ISI, we cannot achieve a true match, thus losing sensitivity. To reduce the ISI, we can first remove at least one already detected symbol (preferably using the nominal value of the detected symbol pulse started at zero phase), and then determine the matching for the 64 templates. This modified MSMF detection is thus called decision feed-back MSMF detection, since it uses the aid of a previous decision. In applications utilizing the FLEX™ family of protocols, this is particularly desirable since we have a known sync pattern ahead of each message, and for Data Unit packets, the previous packet has gone through the Reed-Solomon error correction.

Figure 6:
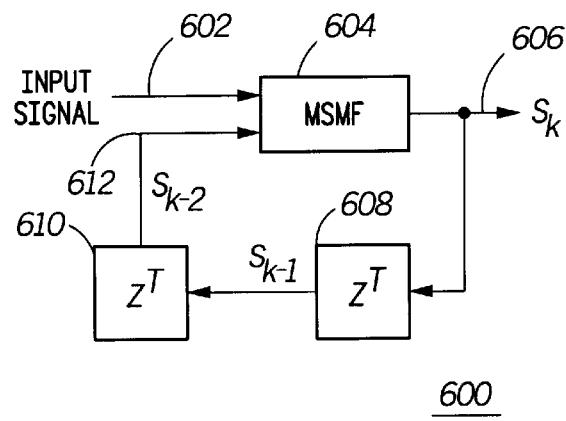
FIG. 6 is a detection logic diagram of a first embodiment of a multi-symbol matched filter (MSMF) symbol estimator in accordance with the present invention.

FIG. 6 is a detection logic diagram 600 of a first embodiment of a multi-symbol matched filter (MSMF) symbol estimator in accordance with the present invention. If we remove one previously detected symbol before the 3-symbol MSMF detection, it is called one-step decision feed back MSMF detection. The input signal 602 is coupled to the MSMF estimator 604, whose output 606 is delayed by delay elements 608 and 610 before being coupled to a feedback input 612 of the estimator 604.

Figure 7:
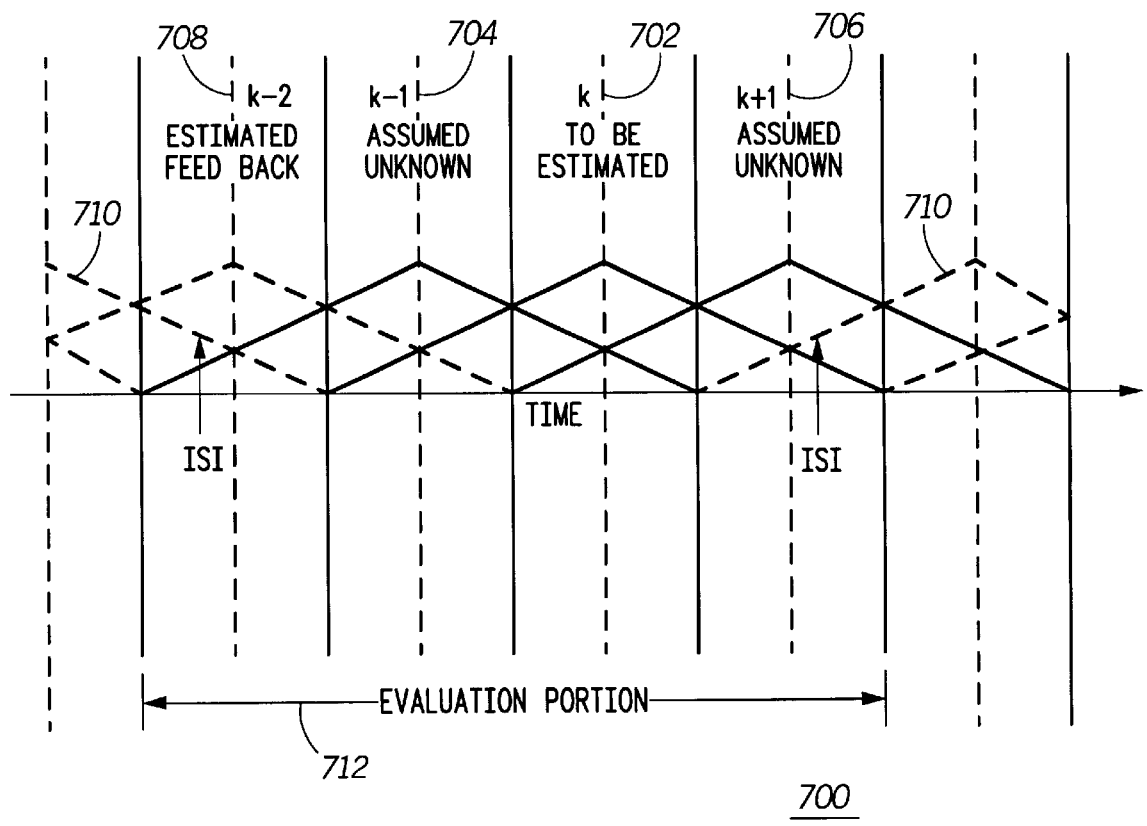
FIG. 7 is a timing diagram depicting residual ISI in the first embodiment in accordance with the present invention.

FIG. 7 is a timing diagram 700 depicting residual ISI in the first embodiment in accordance with the present invention. The kth symbol 702 is the evaluation symbol to be estimated. A preceding symbol 704 and a following symbol 706 are on either side of the evaluation symbol and are both assumed unknown. A previously estimated symbol 708 is prefixed to the other three symbols 704, 702, 706 to form the evaluation portion 712. It is shown that with this approach, the unknown ISI 710 still exists. However, the relative amount of the ISI in significantly reduced, thus increasing the sensitivity.

Figure 8:
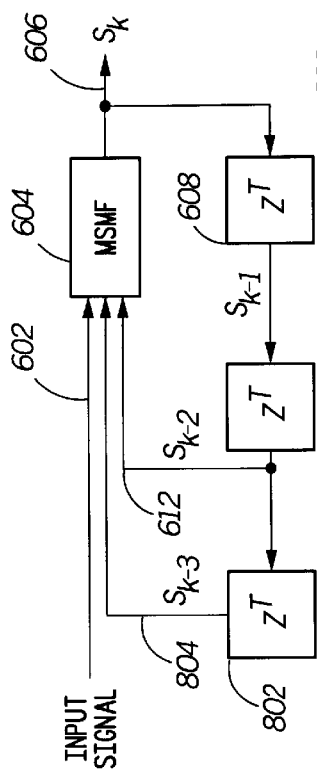
FIG. 8 is a detection logic diagram of a second embodiment of a multi-symbol matched filter (MSMF) symbol estimator in accordance with the present invention.
Figure 9:
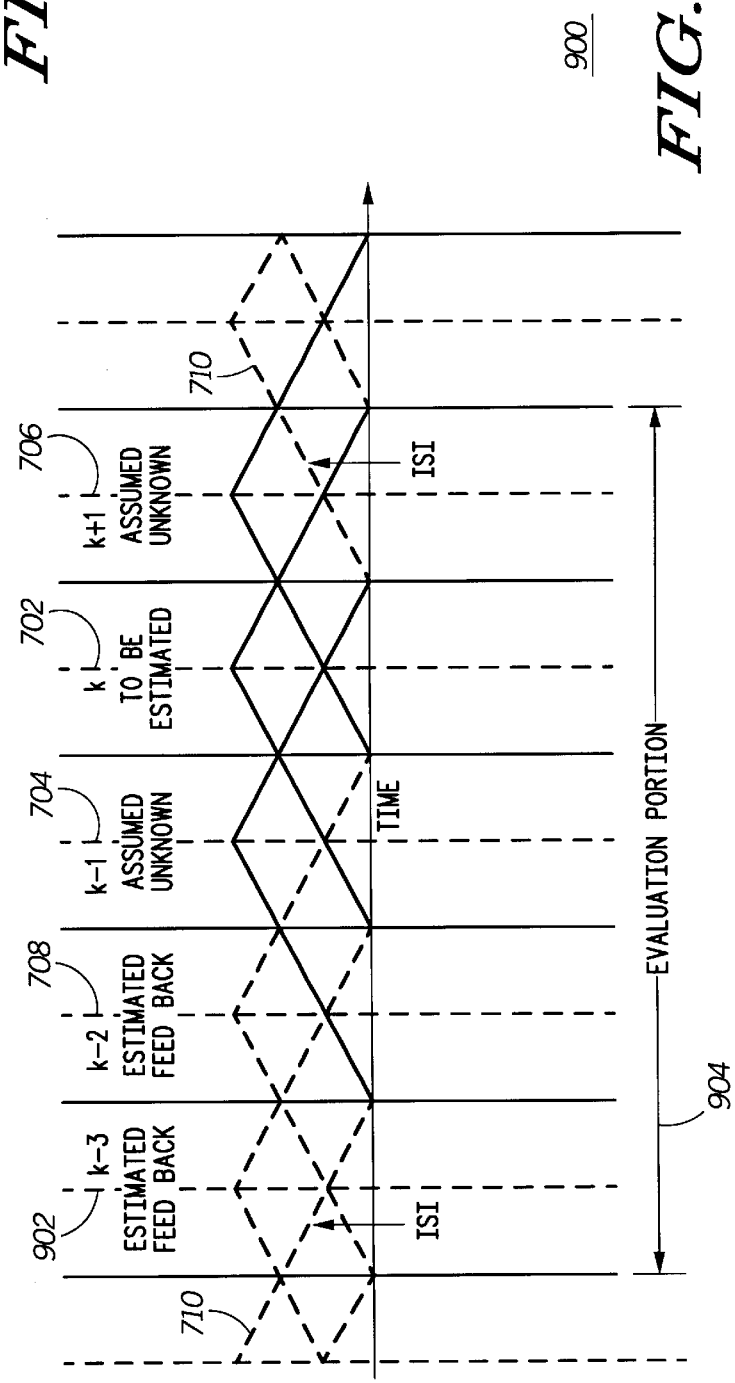
FIG. 9 is a timing diagram depicting residual ISI in the second embodiment in accordance with the present invention.

Similarly, we can remove two previously detected symbols before the 3-symbol MSMF detection, thus it is called two-step decision feed back MSMF detection. The detection logic and the phase removal are given in FIGS. 8 and 9. The detection logic diagram 800 is similar to the diagram 600, the essential difference being the added delay element 802 and additional feedback input 804. The timing diagram 900 is also similar to the diagram 700, the essential difference being the additional previously estimated symbol 902 to form the evaluation portion 904. It is shown that the relative amount of the unknown ISI will be further reduced, thus further increasing the sensitivity.

Simulations have demonstrated that the one-step decision feedback MSMF detection advantageously provides about 3 dB sensitivity gain over prior art techniques, and the two-step version provides an additional 0.5 dB gain.

It is important to point out that the basic idea developed here is equally well applied to after-discriminator detection except that the conjugate multiplication is replaced with subtraction. In addition, a QAM demodulator can also apply the idea to increase the sensitivity.

Figure 10:
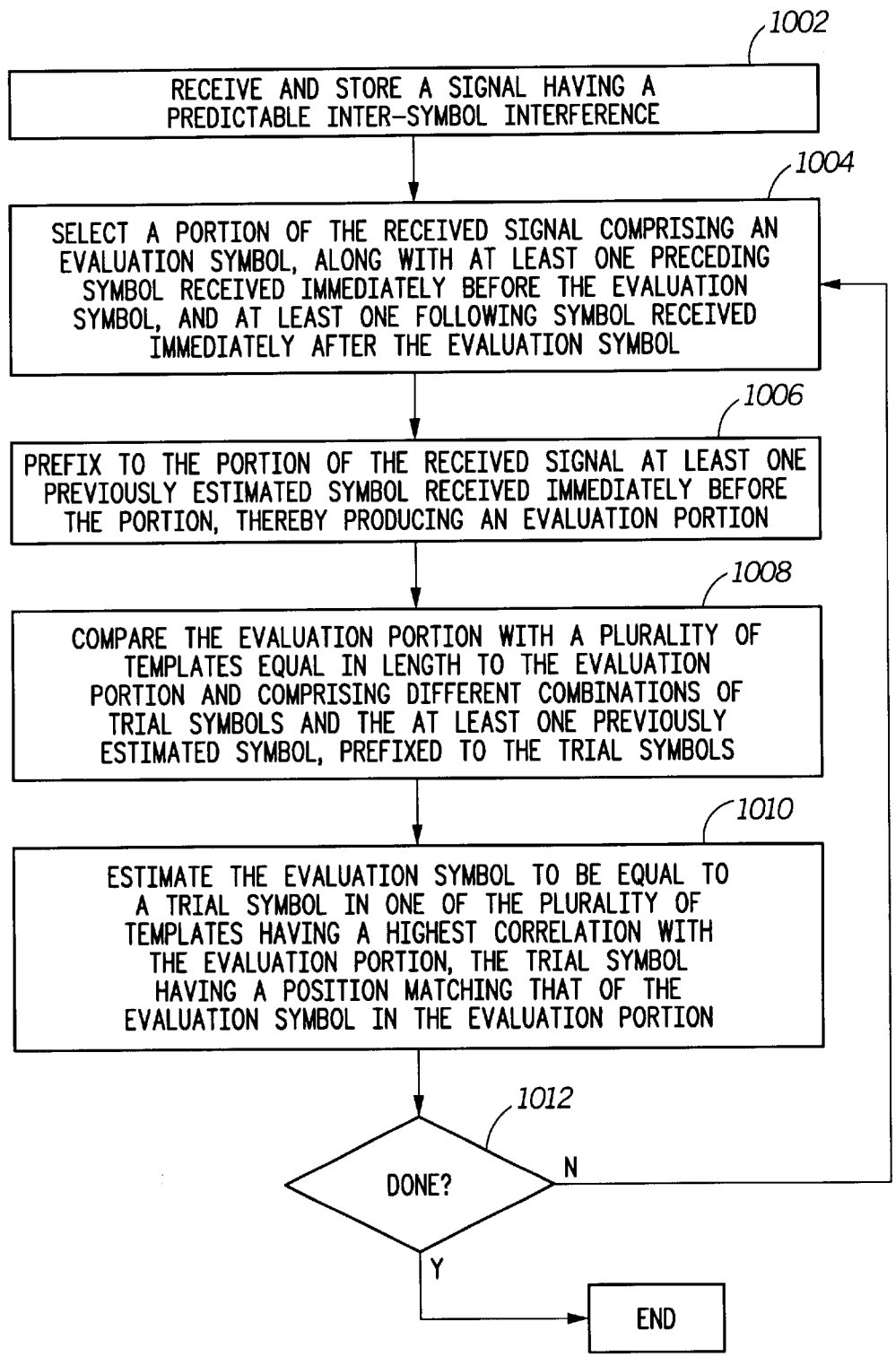
FIG. 10 is a flow diagram summarizing operation of the exemplary communication receiver in accordance with the present invention.

FIG. 10 is a flow diagram summarizing operation of the exemplary communication receiver in accordance with the present invention. Flow begins when the receiver 200 receives 1002 and stores a signal having a predictable inter-symbol interference, such as that caused by a Gaussian premodulation filter of known characteristics. In response, the processing system 216 (i.e., the MSMF detector) selects 1004 a portion of the received signal comprising an evaluation symbol, along with at least one preceding symbol received immediately before the evaluation symbol, and at least one following symbol received immediately after the evaluation symbol. In a first technique according to the present invention, a single preceding symbol and a single following symbol are selected. This leads to the most efficient decoding in terms of processing power. In a second technique, more than one preceding symbol and/or more than one following symbol can be selected. The second technique can provide increased sensitivity, but at a cost of some increased processing power.

The processing system 216 then prefixes 1006 to the portion of the received signal at least one previously estimated symbol received immediately before the portion, thereby producing an evaluation portion. It will be appreciated that, at the start of a message, a known symbol, such as a sync symbol, can be substituted for the at least one previously estimated symbol. In the first embodiment, the at least one previously estimated symbol consists of a single symbol. In the second embodiment, the at least one previously estimated symbol consists of two symbols. It will be appreciated that yet another embodiment can prefix more than two previously estimated symbols received immediately before the portion. In general, prefixing higher numbers of previously estimated symbols produces diminishing amounts of sensitivity increase at the cost of additional processing power.

Next, the processing system 216 compares 1008 the evaluation portion with a plurality of waveform templates equal in length to the evaluation portion and comprising different combinations of trial symbols and the at least one previously estimated symbol, prefixed to the trial symbols. It will be appreciated that throughout the process of comparing the evaluation portion with the plurality of templates, the value(s) of the at least one previously estimated symbol are held constant, as previously estimated. The preceding statement applies to the at least one previously estimated symbol prefixing both the evaluation portion and the trial waveform templates.

In one embodiment, the different combinations of trial symbols include all possible combinations of trial symbols. It will be appreciated that, alternatively, less than all possible combinations of trial symbols need be compared when selected trial symbols can be eliminated, based, for example, on additional information known about the received signal. One part of comparing the evaluation portion includes multiplying the symbols of the evaluation portion by the conjugate of the corresponding symbols of one of the plurality of templates to obtain a test result utilized to determine the correlation between the symbols of the evaluation portion and each of the templates, as described herein above.

The processing system 216 then estimates 1010 the evaluation symbol to be equal to a trial symbol in one of the plurality of templates having a highest correlation with the evaluation portion, the trial symbol having a position matching that of the evaluation symbol in the evaluation portion. The processing system 216 then checks 1012 whether all symbols in the received message have been estimated. If so, the process ends. If not, the flow returns to step 1004 to select a next evaluation symbol.

Thus, it should be clear from the preceding disclosure that the present invention advantageously provides a method and apparatus that can achieve a high receiver sensitivity even in the presence of substantial inter-symbol interference introduced by a relatively severe premodulation filter.

Many modifications and variations of the present invention are possible in light of the above teachings. Thus, it is to be understood that, within the scope of the appended claims, the invention can be practiced other than as specifically described herein above.

What is claimed is:

1. A method for a multi-symbol matched filter (MSMF) estimation of an evaluation symbol in a received signal having a predictable inter-symbol interference, the method comprising the steps of:

selecting a portion of the received signal comprising the evaluation symbol, along with at least one preceding symbol received immediately before the evaluation symbol, and at least one following symbol received immediately after the evaluation symbol;

prefixing to the portion of the received signal at least one previously estimated symbol received immediately before the portion, of the received signal thereby producing an evaluation portion;

comparing the evaluation portion with a plurality of templates equal in length to the evaluation portion and comprising different combinations of trial symbols and the at least one previously estimated symbol, prefixed to the trial symbols; and estimating the evaluation symbol to be equal to a trial symbol in one of the plurality of templates having a highest correlation with the evaluation portion, the trial symbol having a position matching that of the evaluation symbol in the evaluation portion.

2. The method of claim 1, wherein the selecting step comprises the step of selecting the portion of the received signal comprising the evaluation symbol, along with a single preceding symbol, and a single following symbol.

3. The method of claim 1, wherein the prefixing step comprises the step of prefixing to the portion of the received signal a single previously estimated symbol received immediately before the portion of the received signal.

4. The method of claim 1, wherein the prefixing step comprises the step of prefixing to the portion of the received signal two previously estimated symbols received immediately before the portion of the received signal.

5. The method of claim 1, wherein the comparing step comprises the step of comparing the evaluation portion with the plurality of templates equal in length to the evaluation portion and comprising all possible combinations of trial symbols and the at least one previously estimated symbol.

6. The method of claim 1, wherein the comparing step comprises the step of multiplying symbols of the evaluation portion by a conjugate of corresponding symbols of one of the plurality of templates to obtain a test result.

7. A multi-symbol matched filter (MSMF) detector for estimating an evaluation symbol in a received signal having a predictable inter-symbol interference, the detector comprising:

a processing system for processing the received signal, the processing system including:

a processor; and a memory coupled to the processor for storing operating variables and software for programming the processing system, wherein the processing system is programmed to:

select a portion of the received signal comprising the evaluation symbol, along with at least one preceding symbol received immediately before the evaluation symbol, and at least one following symbol received immediately after the evaluation symbol;

prefix to the portion of the received signal at least one previously estimated symbol received immediately before the portion, of the received signal thereby producing an evaluation portion;

compare the evaluation portion with a plurality of templates equal in length to the evaluation portion and comprising different combinations of trial symbols and the at least one previously estimated symbol, prefixed to the trial symbols; and estimate the evaluation symbol to be equal to a trial symbol in one of the plurality of templates having a highest correlation with the evaluation portion, the trial symbol having a position matching that of the evaluation symbol in the evaluation portion.

8. The MSMF detector of claim 7, wherein the processing system is further programmed to select the portion of the received signal comprising the evaluation symbol, along with a single preceding symbol, and a single following symbol.

9. The MSMF detector of claim 7, wherein the processing system is further programmed to prefix to the portion of the received signal a single previously estimated symbol received immediately before the portion of the received signal.

10. The MSMF detector of claim 7, wherein the processing system is further programmed to prefix to the portion of the received signal two previously estimated symbols received immediately before the portion of the received signal.

11. The MSMF detector of claim 7, wherein the processing system is further programmed to compare the evaluation portion with the plurality of templates equal in length to the evaluation portion and comprising all possible combinations of trial symbols and the at least one previously estimated symbol.

12. The MSMF detector of claim 7, wherein the processing system is further programmed to multiply symbols of the evaluation portion by a conjugate of corresponding symbols of one of the plurality of templates to obtain a test result.

13. A receiver for receiving a signal having a predictable inter-symbol interference, the receiver comprising:

a receiver element for receiving and down-converting the signal; and a multi-symbol matched filter (MSMF) detector coupled to the receiver element for estimating an evaluation symbol in the signal, the detector comprising:

a processing system for processing the received signal, the processing system including:

a processor; and a memory coupled to tho processor for storing operating variables and software for programming the processing system, wherein the processing system is programmed to:

select a portion of the received signal comprising the evaluation symbol, along with at least one preceding symbol received immediately before the evaluation symbol, and at least one following symbol received immediately after the evaluation symbol;

prefix to the portion of the received signal at least one previously estimated symbol received immediately before the portion, of the received signal thereby producing an evaluation portion;

compare the evaluation portion with a plurality of templates equal in length to the evaluation portion and comprising different combinations of trial symbols and the at least one previously estimated symbol, prefixed to the trial symbols; and estimate the evaluation symbol to be equal to a trial symbol in one of the plurality of templates having a highest correlation with the evaluation portion, the trial symbol having a position matching that of the evaluation symbol in the evaluation portion.

14. The receiver of claim 13, wherein the processing system is further programmed to select the portion of the received signal comprising the evaluation symbol, along with a single preceding symbol, and a single following symbol.

15. The receiver of claim 13, wherein the processing system is further programmed to prefix to the portion of the received signal a single previously estimated symbol received immediately before the portion of the received signal.

16. The receiver of claim 13, wherein the processing system is further programmed to prefix to the portion of the received signal two previously estimated symbols received immediately before the portion of the received signal.

17. The receiver of claim 13, wherein the processing system is further programmed to compare the evaluation portion with the plurality of templates equal in length to the evaluation portion and comprising all possible combinations of trial symbols and the at least one previously estimated symbol.

18. The receiver of claim 13, wherein the processing system is further programmed to multiply symbols of the evaluation portion by a conjugate of corresponding symbols of one of the plurality of templates to obtain a test result.

\* \* \* \* \*